UNITED STATES PATENT OFFICE.

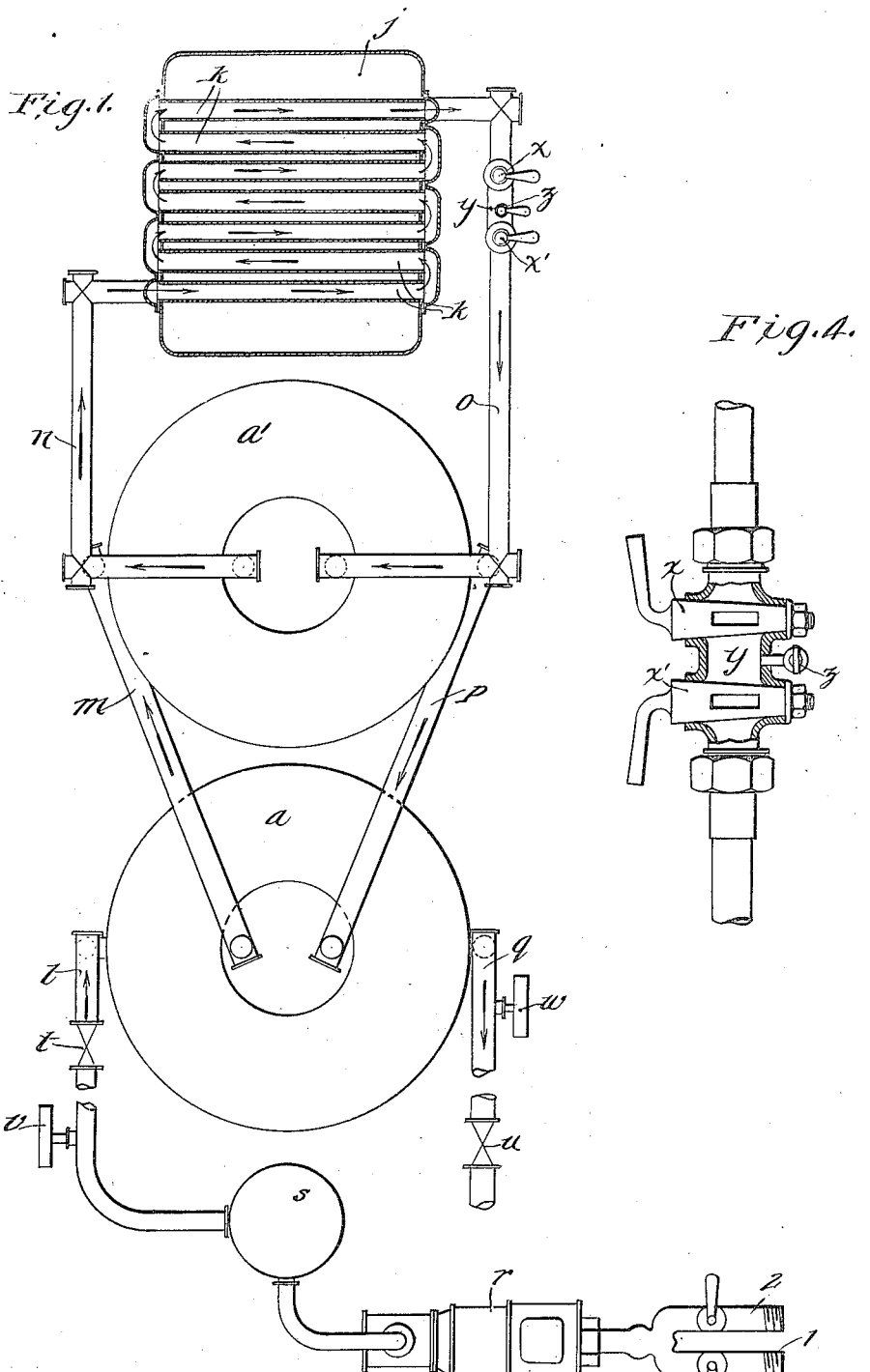

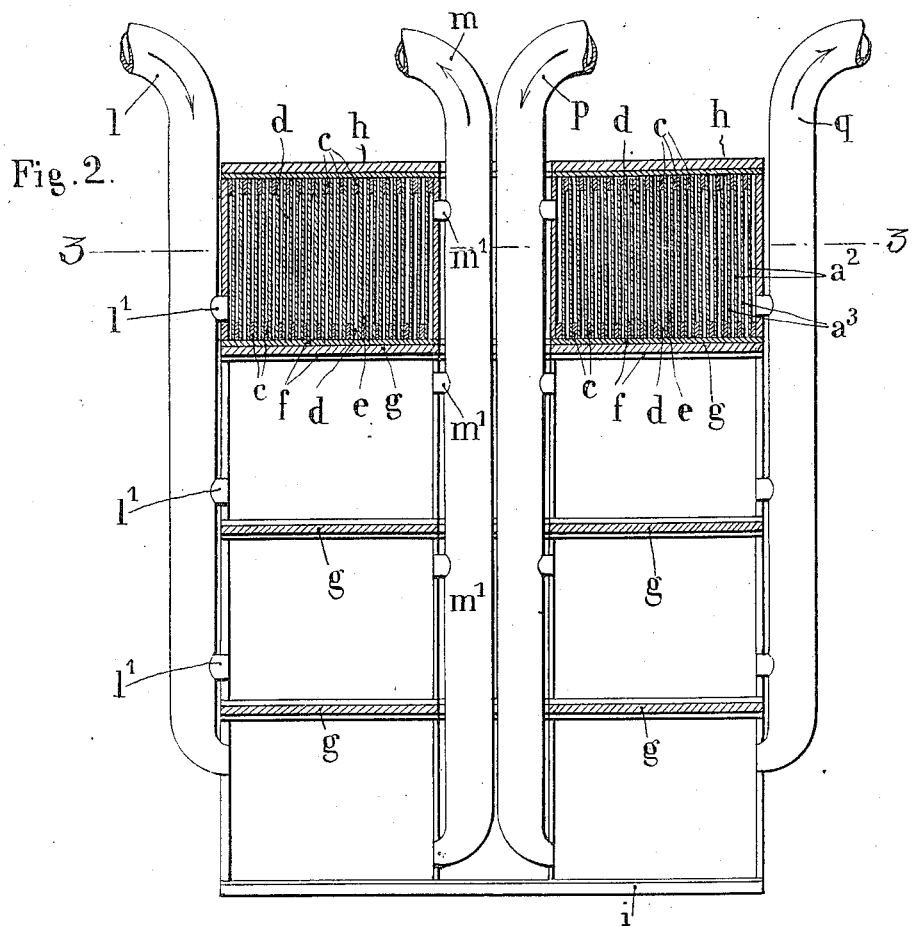
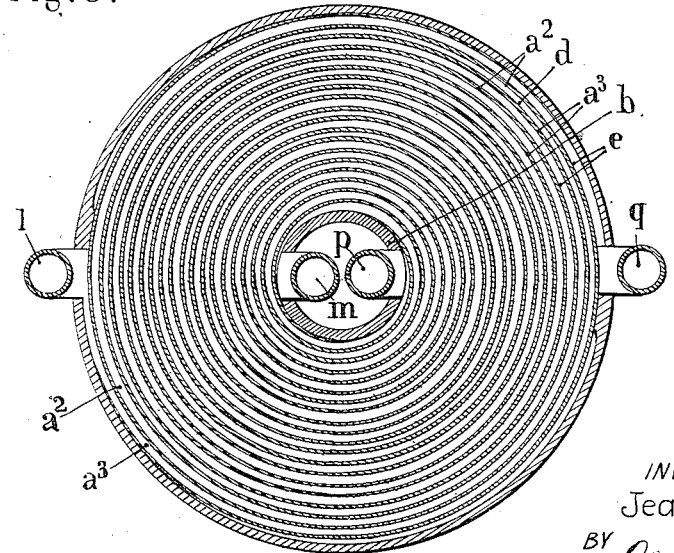

JEAN MÉRIE, OF PARIS, FRANCE.

PROCESS OF STERILIZING LIQUIDS.

1,230,751.　　Specification of Letters Patent.　Patented June 19, 1917.

Application filed April 17, 1914. Serial No. 832,660.

*To all whom it may concern:*

Be it known that I, JEAN MÉRIE, of 135 Rue d'Alésia, in the city of Paris, Republic of France, have invented Improvements in the Process of Sterilizing Liquids, of which the following is a full, clear, and exact description.

In the specification of my pending patent application filed December 18th, 1912, Serial No. 737,412, I have described a process of sterilizing milk in which the milk, protected from the air, is continuously circulated under constant pressure through conduits which are of constant area in order to avoid, in the course of the operation, any prolonged contact of the milk with the walls of the apparatus and any expansion of the liquid likely to lead to the liberation of the gases dissolved in the milk.

The apparatus by means of which this process is carried into effect, comprises a sterilizing apparatus proper and a heat-recuperator or economizer connected therewith, in which the milk to be sterilized is brought gradually to a temperature very near to the sterilizing temperature before it is admitted to the sterilizing apparatus, by the heat given off by the sterilized milk flowing out of the latter.

The present invention relates to improvements in this process of sterilization and has for an object to permit of the initial sterilization of the apparatus before the liquid to be treated is admitted thereto and to bring about the sterilization of the liquid at the very commencement of the operation so that at no time shall there be any prolonged contact of the liquid with the walls of the apparatus or any stoppage of its circulation, from which it follows that at no time during the operation is there produced either ing "scorching" of the casein or caramelization of the lactose.

The accompanying drawing schematically illustrates the sterilizing apparatus wherein the present process is carried out:

Figure 1 shows in a plan view the whole of the sterilizing apparatus.

Fig. 2 is a detail view showing an elevation of a heat-recuperating device partially in vertical section.

Fig. 3 is a horizontal section taken on the line 3—3 of Fig. 2.

Fig. 4 is a detail view illustrating the valves and chamber in the outlet of the coil of the sterilizer proper.

As shown in the drawing, such sterilizing apparatus comprises:

1. Two heat-recuperating or economizing devices $a$, $a'$, consisting of several superposed elements, each of which, as shown by Figs. 2 and 3, is constituted by two sheets of tinned copper $a^2$, $a^3$, spirally coiled, about a core $b$; the said sheets are joined together by bands $c$ which alternately close the said elements on the upper side and on the lower side, as shown in Fig. 2. The bands $c$ serve to connect the sheets $a^2$, $a^3$, and maintain between the latter the space for the circulation of the liquid. Thus each element comprises two channels $d$, $e$, the one being open at the bottom and the other at the top. Two successive elements are separated by two sheets of rubber $f$ or other elastic material, between which is placed a copper plate $g$. Above and underneath the apparatus are two strong plates $h$, $i$, which may be connected with each other by bolts, whereby the whole is united.

2. A heater or sterilizer constituted by a vessel $j$, heated in any suitable manner and crossed by parallel tubes $k$, connected on the outside of the vessel by removable intercommunications. The said tubes constitute a coil immersed in water in the vessel, the water forming a water bath, the temperature of which may be easily regulated, so that the same remains constant.

The liquid to be treated comes by a pipe $l$ and enters the channel $d$ of each element of the first heat-recuperating device $a$ by nozzles $l'$, and flows through the said channel; and then flows out through the nozzles $m'$ and is introduced from the conduit $m$ into channel $d$ of each element of the second heat-recuperating device $a'$. On leaving the latter, the liquid passes through the pipe $n$ to the coil $k$ of the sterilizer proper. The sterilized liquid on flowing out of the latter is introduced from the conduit $o$ into the channels $e$ of the heat-recuperator $a'$, then on leaving the latter flows through the pipe $p$ into the channels $e$ of the heat-recuperating device $a$, and finally flows out of the apparatus through the pipe $q$.

In order to provide for a supply and circulation of the liquid under a constant pressure, the plant, as shown in Fig. 1, in front of the first heat-recuperating device $a$, has a pump $r$, and a closed tank $s$ which acts to regulate the pressure. In Fig. 1, an inlet for water to the apparatus is indicated at 1, and an inlet for milk or other liquid to be sterilized, is indicated at 2, cocks controlling said inlets.

On the inlet and outlet of the first heat-recuperator $a$ are mounted two valves or cocks $t$, $u$, and two pressure gages $v$, $w$, which permit of regulating the discharge of the liquid at the desired pressure.

The inlet valve $t$ being quite open, it may be ascertained on the pressure gage $v$ whether the pressure, under which the liquid is forced, corresponds to the pressure or tension of the vapor at the sterilizing temperature; by adjusting the outlet valve or cock $u$, the flow of liquid may be regulated for the delivery desired.

The pressure being held constant at the inlet, the pressure at the outlet is also constant, for a constant delivery.

In the present improved process, at the commencement of the operation, the apparatus is filled with an inert liquid, for instance water, which enters the apparatus at the water inlet 1. The operation begins by filling with water the whole of the apparatus, that is to say, the heat-recuperators $a$, $a'$, the coil $k$ of the sterilizer proper and the whole of the piping; then the sterilizer is heated to the sterilizing temperature. The outlet cock $u$ is then slightly opened, the water contained in the sterilizer coil $k$ is evaporated and the steam so formed forces the water in front of it; when the steam appears at the cock $u$, the operator is thus warned that the apparatus is sterilized.

When this sterilization is completed the cock $u$ is closed and water is forced by the pump $r$ into the apparatus for filling it again. When the apparatus is filled with water and the cocks of the circulation closed, the sterilizer is heated, preferably by admitting in the water bath of the sterilizer, until the whole of the apparatus is brought into the normal condition of service. When the temperature has reached 80° c., for instance, the circulation valves $t$, $u$ are slightly opened, the temperature of the liquid entering the apparatus increases rapidly and in a few minutes reaches very nearly the sterilizing temperature (about 110°) its passage into the heated sterilizer at last giving it the temperature required for the sterilization, (115°).

When equilibrium of temperature or the normal condition of service has been established the water inlet is closed and milk is introduced into the apparatus through the milk inlet 2, from a reservoir maintained at the pressure necessary to equilibrate the tension of the vapors produced at the sterilizing temperature. Thus the milk is introduced so that the operation may proceed without change, stoppage, or expansion, the milk forcing the water in front of it to and out of the outlet.

The sterilization of the milk is thus effected according to the conditions set out in the above mentioned patent application, that is to say without any risk either of caramelizing the lactose or of scorching the casein.

At the end of each operation it is necessary to expel the milk to the last drop in order not to leave any of it in prolonged contact with the hot walls of the passages; to this end the inlet for the milk is closed and the apparatus is filled with water immediately after the exit of the milk, while continuing to heat the sterilizer, so that the said cleaning water is itself sterilized. The water so introduced forces in front of it the milk which is still in the apparatus. Water is so forced through the apparatus until such water is delivered quite clear.

The apparatus thus cleans itself by the passage of the hot water and may remain in operation for several weeks without being taken to pieces if the precaution be observed of passing through it an alkaline solution from time to time in order to get rid of the greasy residues which adhere to the walls.

At the end of each operation the sterilizer remains full of water under pressure.

In order to avoid, when the heating of the sterilizer is stopped, the water which, has not yet passed through the sterilizer (and which has not been sterilized) from contaminating the sterilized water which has passed through the sterilizer, the exit pipe of the sterilizer is provided with a set of valves by means of which this contamination is avoided.

On the outlet pipe of the coil $k$ of the sterilizing apparatus are arranged two valves $x$, $x'$ mounted at each end of a chamber $y$ which is provided with a purge cock $z$. When the two valves $x$, $x'$ are closed the purge cock $z$ is opened in order to empty the chamber $y$ which is then dried by heating it by a flame so as to create between the two valves $x$, $x'$ a dry and sterilized chamber.

It will be understood that when the apparatus is filled with water at the close of an operation and the heating of the sterilizer is stopped, the above described arrangement is used to separate the sterilized water which has passed through the sterilizer from the unsterilized water and prevent contamination of the sterilized water.

With this arrangement it is not necessary, when the operation ceases and the heating of the sterilizer is stopped, to begin the whole process anew.

When the apparatus is to be put again into operation the valves $x$, $x'$, are opened to allow passage therethrough only at the moment when the water which the coil $k$ of the heating device or sterilizer contains has reached the sterilizing temperature.

Beer, wine, cider, and in fact all kinds of alimentary liquids as well as water, may be treated by this improved process.

Claims:

1. A process for sterilizing alimentary liquids in a sterilizing apparatus, consisting in sending water into the whole of the apparatus, at the beginning of the operation, in bringing this water to the sterilizing temperature, in causing said water to be displaced by the liquid to be treated and, at the end of the operation, in displacing by water the liquid which has been treated.

2. In a process for sterilizing alimentary liquids in a sterilizing apparatus, displacing by water the liquid which has been treated leaving the apparatus full of water when the operation ceases, and separating the sterilized water which has passed through the sterilizer from the unsterilized water in the apparatus.

3. A process for sterilizing alimentary liquids in a sterilizing apparatus, consisting in sending water into the whole of the apparatus at the beginning of the operation, in bringing the water to the sterilizing temperature, in displacing said water by the liquid to be treated, then, a little before stopping the operation, in displacing by water the liquid which has been treated, and finally in separating the sterilized water in the apparatus from the unsterilized water, to prevent, while the apparatus is at rest, the contamination of the sterilized water.

The foregoing specification of my improvements in the process of and in apparatus for sterilizing liquids signed by me this second day of April, 1914.

JEAN MÉRIE.

Witnesses:
CHAS. P. PRESSLY,
RENÉ THIRIOT.